United States Patent
Pak et al.

(10) Patent No.: US 10,133,464 B2
(45) Date of Patent: *Nov. 20, 2018

(54) SELECTIVELY REENABLING AN INTERACTIVE ELEMENT FOR THE COLLECTION OF USER FEEDBACK

(71) Applicant: Disney Enterprises, Inc., Burbank, CA (US)

(72) Inventors: Paul Pak, Van Nuys, CA (US); Adam Semeniuk, Kelowna (CA); Christopher E. Adamson, Kelowna (CA); Michael L. Vanloon, Kirland, WA (US); James C. Warnock, Kelowna (CA); Charity J. Gerbrandt, Kelowna (CA); Amanda D. Penner, Peachland (CA); Marc Silbey, Mercer Island, WA (US)

(73) Assignee: Disney Enterprises, Inc., Burbank, CA (US)

( * ) Notice: Subject to any disclaimer, the term of this patent is extended or adjusted under 35 U.S.C. 154(b) by 521 days.

This patent is subject to a terminal disclaimer.

(21) Appl. No.: 14/797,832

(22) Filed: Jul. 13, 2015

(65) Prior Publication Data

US 2016/0018977 A1 Jan. 21, 2016

Related U.S. Application Data

(63) Continuation of application No. 13/488,053, filed on Jun. 4, 2012, now Pat. No. 9,082,132.

(51) Int. Cl.
*G06F 3/0484* (2013.01)
*G06F 3/048* (2013.01)
(Continued)

(52) U.S. Cl.
CPC ............ *G06F 3/04847* (2013.01); *G06F 3/00* (2013.01); *G06F 3/048* (2013.01);
(Continued)

(58) Field of Classification Search
CPC ........ G06F 3/00; G06F 3/04847; G06F 3/048; G06Q 30/0241; G06Q 50/01; H04L 67/10
See application file for complete search history.

(56) References Cited

U.S. PATENT DOCUMENTS

| | | | | |
|---|---|---|---|---|
| 6,459,360 B1 * | 10/2002 | Helferich | ............ | H04W 84/025 340/7.2 |
| 7,730,043 B1 * | 6/2010 | Bourdev | ................. | G06T 11/60 707/695 |

(Continued)

*Primary Examiner* — Anil K Bhargava
(74) *Attorney, Agent, or Firm* — Patterson + Sheridan, LLP (57) ABSTRACT

Techniques for receiving user feedback for an instance of content. Embodiments provide an interface that includes an interactive element through which users can provide feedback for an instance of content. Responsive to a first user interacting with the interactive element, an indication of user feedback from the first user is registered for the instance of content. Upon determining that the indication of user feedback from the first user has been registered for the instance of content, the interactive element is disabled within the interface for the first user. Embodiments monitor the instance of content to detect changes to the instance of content and, upon detecting a change to the instance of content since the first user provided the user feedback for the content, automatically and without user interaction, re-enable the interactive element for the first user such that the first user can again interact with the interactive element.

20 Claims, 8 Drawing Sheets

(51) Int. Cl.
*G06F 3/00* (2006.01)
*G06Q 30/02* (2012.01)
*G06Q 50/00* (2012.01)
*H04L 29/08* (2006.01)

(52) U.S. Cl.
CPC ......... *G06Q 30/0241* (2013.01); *G06Q 50/01* (2013.01); *H04L 67/10* (2013.01)

(56) References Cited

U.S. PATENT DOCUMENTS

| | | | |
|---|---|---|---|
| 8,732,605 B1* | 5/2014 | Falaki | G06Q 30/02 715/780 |
| 2002/0072955 A1* | 6/2002 | Brock | G06Q 30/02 715/758 |
| 2004/0085354 A1* | 5/2004 | Massand | G06F 17/2229 715/751 |
| 2009/0125834 A1* | 5/2009 | Morris | G06F 17/241 715/780 |
| 2010/0095198 A1* | 4/2010 | Bultrowicz | G06F 17/241 715/234 |
| 2010/0251094 A1* | 9/2010 | Holm | G06F 17/30867 715/230 |
| 2010/0325560 A1* | 12/2010 | Bryan | G06F 17/30525 715/753 |
| 2012/0179552 A1* | 7/2012 | Tishkevich | G06Q 30/02 705/14.66 |
| 2013/0067357 A1* | 3/2013 | Rose | G06F 3/048 715/760 |
| 2013/0179799 A1* | 7/2013 | Savage | G06F 3/0482 715/751 |
| 2013/0290510 A1* | 10/2013 | Klooster | G06Q 30/0207 709/224 |
| 2013/0326355 A1 | 12/2013 | Pak et al. | |

\* cited by examiner

SELECTIVELY REENABLING AN INTERACTIVE ELEMENT FOR THE COLLECTION OF USER FEEDBACK

CROSS-REFERENCE TO RELATED APPLICATIONS

This application is a continuation of co-pending U.S. patent application Ser. No. 13/488,053, filed Jun. 4, 2012. The aforementioned related patent application is herein incorporated by reference in its entirety.

BACKGROUND

Field of the Invention

The present invention generally relates to collecting user feedback and more specifically to techniques for selectively allowing users to repeatedly submit positive feedback for a single instance of content.

Description of the Related Art

A virtual world is a simulated environment in which users may interact with virtual objects and locations of the virtual world. Each user may control a respective avatar through which the user may interact with other users' avatars in the virtual world. An avatar generally provides a graphical representation of an individual within the virtual world environment. Avatars are usually presented to other users as two or three-dimensional graphical representations that resemble a human individual. Frequently, virtual worlds allow multiple users to enter the virtual environment and interact with one another. Virtual worlds are said to provide an immersive environment, as they typically appear similar to the real world and objects tend to follow rules related to gravity, topography, locomotion, physics and kinematics. Of course, virtual worlds can suspend or alter these rules as well as provide other imaginative or fanciful environments. Users typically communicate with one another through their avatars using text messages sent between avatars, real-time voice communication, gestures displayed by avatars, symbols visible in the virtual world, and the like.

In addition, some virtual worlds enable users to create content within the virtual world. For example, many virtual worlds allow users to customize their avatars within the virtual world. As another example, other virtual worlds are configured to allow users to create a personalized house for their avatar. For instance, an arctic-themed virtual world could allow each user to customize their own penguin avatar and to customize an igloo for their avatar to live in. Such a virtual world may further allow users to view the user-created content of other users. For instance, a first user's avatar could view the igloo of a second user in order to see how the second user has personalized his/her igloo. Doing so provides a social aspect to the user-generated content, as this content may be visible to other users of the virtual world. This, in turn, may provide a starting point for conversations between the users of the virtual world and may further provide an incentive for the users to put effort into creating personalized content.

Additionally, content sharing websites account for some of the most popular websites today and oftentimes also include user-generated content. Generally, content sharing websites allow users to post content and share posted content with other users. For example, a user may upload a user-created video to a content sharing website, and then share the uploaded video with other users. Furthermore, a number of content sharing websites also allow users to create new content, which can then be shared with other users of the site. As an example, a content sharing website may enable users to create images using the website, and then share the created images with other users of the website.

In an effort to learn a user's preferences and to improve the user's experience, many applications include mechanisms to solicit and collect user feedback regarding the application. For instance, an application could prompt a user with a survey regarding the user's experience while using the application, and the developers of the application could then use feedback collected from the survey to guide future development of the application. As another example, a user on a social networking site could identify content that the user likes (e.g., a particular brand of good, a specific website, etc.), and the social networking site could then display an indication of this content within the user's profile. Doing so enables the user to inform other users of content that the user likes. Additionally, the social networking site may collect information regarding instances of content and types of content that each user likes, and could analyze such information to determine the interests of the users. Such interests information could be used, for instance, to identify relevant advertisements to present to particular users of the social networking site.

SUMMARY

Embodiments provide a method, system and computer-readable storage medium that include providing an interface that includes an interactive element through which users can provide feedback for an instance of content. According to the method, system and computer-readable storage medium, responsive to a first user interacting with the interactive element, an indication of user feedback from the first user is registered for the instance of content. Further according to the method, system and computer-readable storage medium, upon determining that the indication of user feedback from the first user has been registered for the instance of content, the interactive element is disabled within the interface for the first user. The method, system and computer-readable storage medium further include monitoring the instance of content to detect changes to the instance of content and, upon detecting a change to the instance of content since the first user provided the user feedback for the content, automatically and without user interaction, re-enabling the interactive element for the first user such that the first user can again interact with the interactive element.

Another embodiment provides a method that includes providing an interface that includes an interactive element through which users can provide feedback for an instance of user-generated content created by a first user within a virtual world. The method includes, responsive to a second user interacting with the interactive element, registering an indication of user feedback from the second user for the instance of content. Additionally, the method includes, upon determining that the indication of user feedback from the first user has been registered for the instance of content. The method further includes disabling the interactive element within the interface for the second user and initiating a timer associated with the disabled interactive element. The method also includes, upon expiration of the timer, re-enabling the interactive element for the second user such that the second user can again interact with the interactive element.

BRIEF DESCRIPTION OF THE DRAWINGS

So that the manner in which the above recited aspects are attained and can be understood in detail, a more particular description of embodiments of the invention, briefly summarized above, may be had by reference to the appended drawings.

It is to be noted, however, that the appended drawings illustrate only typical embodiments of this invention and are therefore not to be considered limiting of its scope, for the invention may admit to other equally effective embodiments.

DETAILED DESCRIPTION

In the present disclosure, some virtual worlds are described as being persistent. A persistent world provides an immersive environment (e.g., a fantasy setting used as a setting for a role-playing game, or a virtual world complete with land, buildings, towns, and economies) that is generally always available and where events continue to occur regardless of the presence of a given avatar. Thus, unlike more conventional online games or multi-user environments, the virtual world continues to exist and plots and events continue to unfold as users enter (and exit) the virtual world. Virtual environments are presented as images on a display screen and some virtual environment may allow users to record events that occur within the virtual environment.

Furthermore, some virtual worlds enable users to create customized content within the virtual world. For example, an arctic-themed virtual world could enable users to create a customized penguin avatar and a customized igloo for their avatar. Additionally, such a virtual world may not only allow users to view user-generated content created by other users, but may also provide a mechanism through which users can provide feedback on the user-generated content. For instance, a virtual world could display an interactive element (e.g., a "Like" button) associated with a particular instance of user-generated content which other users could interact with (e.g., by clicking on the button using a mouse pointer) in order to express positive feedback for the instance of user-generated content. As an example, a first user could create a personalized igloo for his avatar and a second user, upon viewing the first user's igloo, could interact with a "Like" button in order to provide an indication of positive feedback for the first user's igloo.

As another example, a virtual world could be a community site to which users can generate and/or submit user-generated content for the other users of the community site to view. For instance, one embodiment could provide a community website which provides tools (e.g., via web pages) that users can use to draw instances of user-generated content. In such an example, the website could further provide a mechanism through which users can submit their created content for view by other users. The submitted content could then be posted to a gallery portion of the website. The other users of the community site could then view the posted content and could interact with interactive elements (e.g., a "Like" button, an up arrow, a "Thumbs Up" button, etc.) within the gallery to rate the posted content.

Typically, each user can interact only a single time with such an interactive element (e.g., a "Like" button). That is, once a user selects an interactive element to indicate a like or dislike for particular content, there may be no further input needed from the user with respect to the user's opinion regarding the content. As such, once a user has indicated his/her like (or dislike) for an instance of content (e.g., a user-generated object, a video, a website, etc.) using the interactive element associated with the particular content, the interactive element may be disabled for the user.

However, such an arrangement for collecting user feedback may not be ideal for use with all types of content. For example, consider a virtual world in which users can create customized virtual content, and assume that a first user designs a custom igloo for his avatar in an iterative fashion, where the first user makes iterative improvements to the igloo during each of a plurality of sessions in the virtual world. In such an example, a second user could view the first user's igloo after only the first session, when the first user has only made a relatively small number of improvements to the igloo. As a result, the second user could rate the first user's igloo with a negative score. However, such negative feedback may persist with the first user's igloo, even after the first user has made numerous improvements to his igloo, and thus the first user may have no way to overcome this negative feedback. As another example, even in the event the second user provides positive feedback for the first user's igloo after the first session, the second user may be precluded from providing subsequent positive feedback once the first user has been additional improvements to the igloo.

As such, embodiments generally provide techniques for receiving user feedback for an instance of content within an application. The content may be embodied in a number of different forms. Examples of such content include, without limitation, virtual objects (e.g., a virtual object, an avatar, audio content, video content, image content, and textual content. Additionally, the content could originate from various sources, including users of the application (e.g., an avatar for a user), developers of the application (e.g., a fixed virtual object within the application), or a third party to the application (e.g., a link within the application to video content created by a third party). Further, the content may be fixed content (e.g., a final version of a video file uploaded to a website) and dynamic content (e.g., a customizable avatar within a virtual world and subject to subsequent customization). More generally, the content may be any element within an application for which user feedback can be collected.

Embodiments provide an interface that includes an interactive element through which users can provide feedback for an instance of content. For example, in one embodiment, the interface may be implemented as a web page that is displayed within a web browser. In such an example, the web page could include an instance of content (e.g., a user-created image) and a "Like" button associated with the content, which users could select in order to indicate positive feedback for the content. Responsive to a first user interacting with the interactive element (e.g., a user clicking on the "Like" button), an indication of user feedback from the first user is registered for the instance of content.

For example, embodiments could detect when a user depresses the "Like" button within the web page and, in response, could increment a counter of the total number of likes for the instance of content. Additionally, embodiments may disable the interactive element within the interface, such that the first user can no longer interact with the interactive element. For instance, in the above example, the "Like" button could be disabled in such a fashion that the user can no longer depress the button. Embodiments may also monitor the instance of content to detect changes to the instance of content. For example, the content could be a virtual object (e.g., an avatar's house in a virtual world) created by a user and that the user can continue to make changes to and customize within the virtual world. Upon detecting a change to the content, embodiments may again enable the interactive element for the first user, such that the first user can again interact with the interactive element. Thus, continuing the above example, the "Like" button within the web page could be re-enabled, thereby allowing the user to once again interact with the button. In other words, the first user may be able to indicate positive feedback multiple times for a single instance of content.

In a particular embodiment, the user that authored the first instance of content is provided with an option to re-enable the "Like" button for all users who have already submitted positive feedback for the first instance of content. For example, a first user could create an igloo within an arctic-themed virtual world and a second user could provide positive feedback for the first user's igloo by depressing the "Like" button associated with the first user's igloo. Embodiments could then disable the "Like" button for the second user. At some later point in time, the first user could make additional changes to his igloo. For example, the first user could add several new objects to his igloo one evening but could still wish to make additional modifications to his igloo. Continuing this example, the user could return to the virtual world on the next night and could finish revising his igloo. At this point, the first user could indicate that the "Like" button should be re-enabled for all users who have already submitted positive feedback for the first user's igloo. For instance, the virtual world client could provide a "Re-enable feedback" button that the first user could activate. Upon receiving the indication to re-enable feedback for the first user's igloo, embodiments could re-enable the "Like" button associated with the igloo for the second user, thereby allowing the second user to provide additional positive feedback for the first user's igloo if he wishes to. Advantageously, doing so allows a user to control when other users will be given the option the provide positive feedback for content the user has authored, and essentially allows the user to create various versions of an instance of content and allow other users to provide additional indications of positive feedback for each version of the content if the other users wish to.

In one embodiment, information is presented to a first user describing how other users have rated content created by the first user over a period of time. For example, embodiments could analyze user feedback for the first user's content and could determine how each iteration of the content has been received by the other users. Advantageously, doing so can help the first user to determine which alterations to the content have been well-received by the other users of the content server. As an example, a user could create a picture to be hosted on the content server and available for other users to view. In this example, assume that the user initially creates a first version of the picture which consists of a basic sketch of a penguin and that, at some later point in time, the user revises the picture to add color, shading and other details to the penguin. In such an example, the user could have received 20 instances of positive feedback for the first version of his picture from other users of the content server, but could have received 200 instances of positive feedback for the completed drawing. Here, embodiments could analyze the feedback for the user's drawing and could provide the user with information regarding how the feedback from the other users relates to the various iterations of the drawing. Doing so allows the user to learn which alterations to his drawing resulted in the biggest improvement in user feedback, which in turn may help the user in further improving the drawing in the future.

Additionally, it is broadly contemplated that embodiments described herein could be adapted for use with real-world content. Such real-world content could include, for instance, physical objects (e.g., a toy, a tennis racquet, etc.), media content (e.g., movies, video games, etc.), exhibits (e.g., an art exhibit), attractions (e.g., a ride at a theme park), a place (e.g., a restaurant, a city, etc.), and so on. As an example, a website could be provided through which users can submit feedback for local restaurants by interacting with interactive elements associated with the restaurants. Once a user interacts with the interactive element for a particular restaurant, embodiments could disable the interactive element associated with the particular restaurant for the user. A timer could be initiated. For instance, such a timer could be configured to expire after a predetermined amount of time. As a second example, such a timer could be configured to expire at a predetermined moment in time. Upon expiration of the timer, embodiments could re-enable the interactive element for the particular restaurant for the user.

Figure 1:
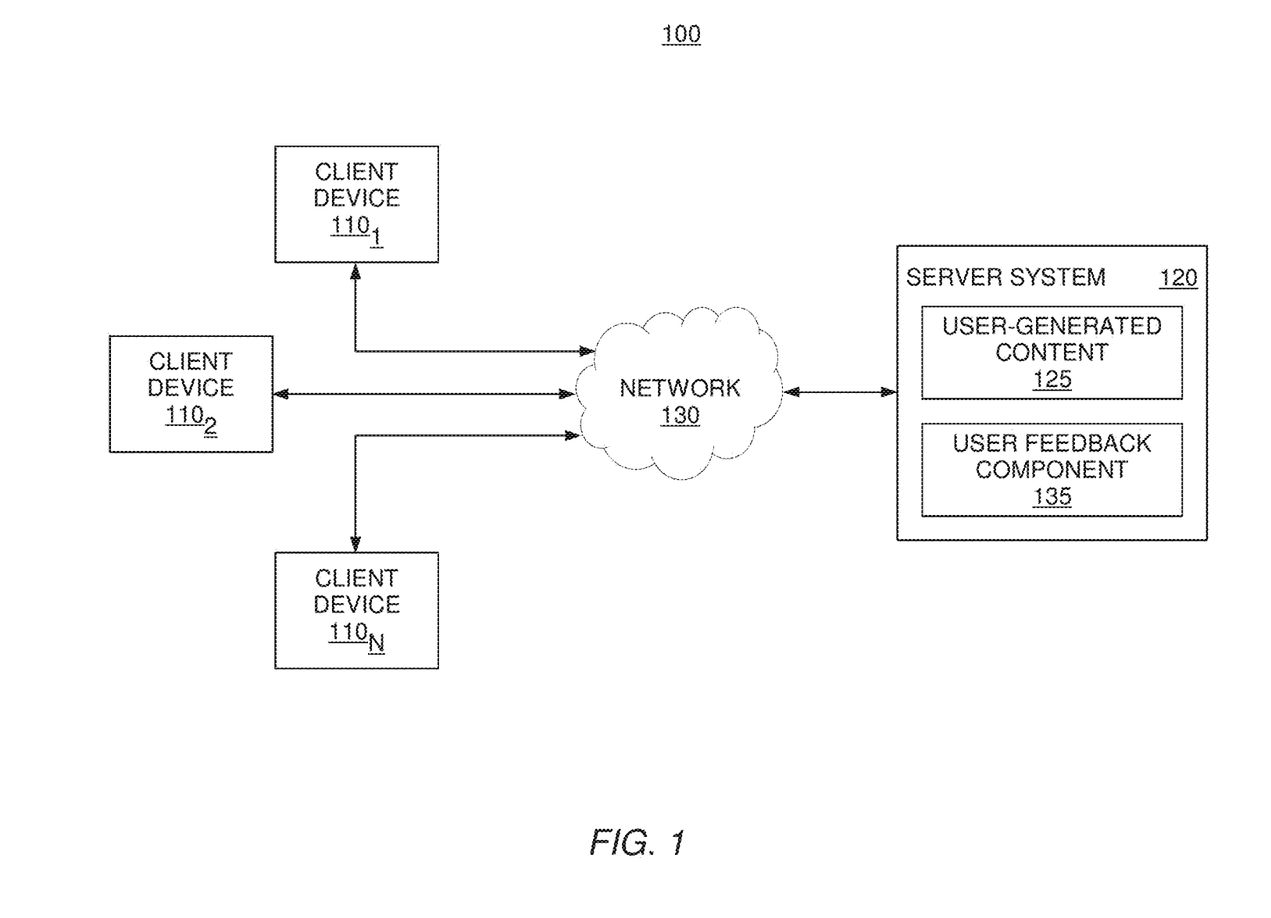
FIG. 1 is a block diagram illustrating a system configured with a user feedback component, according to one embodiment described herein.

FIG. 1 is a block diagram illustrating a system configured with a user feedback component, according to one embodiment described herein. As shown, the system 100 includes a plurality of client devices 1101-N communicatively coupled with a server system 120 via a network 130. Generally, the network 130 represents any communications network, including a local network, an intranet and the Internet. As shown, the server system 120 includes user-generated content 125 and a user feedback component 135. The client devices 110$_{1-N}$ represent any computer systems and devices capable of executing a client application configured to retrieve instances of the user-generated content 125 from the server system 120 (e.g., a virtual world client, a web browser, etc.). For example, in one embodiment the client device 110$_1$ could be a personal computer system, the client device 110$_2$ could be a handheld gaming device, and the client device 110$_N$ could be a gaming console device.

As discussed above, a gaming client on the client devices 110$_{1-N}$ could display instances of the user-generated content 125 to users of the client devices 110$_{1-N}$. Additionally, the gaming client could provide an interface that includes an interactive element through which the users can provide feedback for the instance of user-generated content 125. In one embodiment, the client devices 110$_{1-N}$ are configured to retrieve the interface containing the interactive element from the server system 120 (e.g., in the form of a web page) and to output the interface for display to users of the client device. Responsive to a first user interacting with the interactive element, the user feedback component 135 could register an indication of user feedback from the first user for the corresponding instance of user-generated content 125. For example, a user could select a "Like" button within the displayed user interface on the client device 110$_1$ and, in response to the user selection, the client device 110₁ could transmit a notification to the user feedback component 135. The user feedback component 135, upon receiving the notification from the client device 110₁, could register the indication of positive feedback with the corresponding instance of user-generated content 125 (e.g., by incrementing a counter associated with positive feedback for the instance of content 125).

Additionally, the client application could disable the interactive element associated with the instance of user-generated content 125 for the first user. Thus, for example, once the user has expressed positive feedback for the instance of content 125 by selecting the "Like" button associated with the instance of content 125 within the interface, the client application could disable the "Like" button for the first user. That is, as discussed above, when the interactive elements are used to indicate a like or dislike for instances of content, the interactive elements may be configured as single-use objects within the interface.

The user feedback component 135 could then monitor the instance of content to detect changes to the instance of content. For instance, for an instance of user-generated content 125 authored by a second user, the user feedback component 135 could detect when the second user makes additional modifications to the instance of content 125. Upon detecting a change to the instance of content, user feedback component 135 could re-enable the interactive element for the first user (i.e., the user who interacted with the interactive element), such that the first user can again interact with the interactive element. In one embodiment, the user feedback component 135 may also generate a notification to the first user, indicating that the instance of user-generated content 125 has been modified. Such a notification can help to make the first user aware of the updated instance of content 125 and may motivate the user to again review and provide feedback for the content. Additionally, in a particular embodiment, the user feedback component 135 could ensure that a minimum amount of time passes from when the interactive element is disabled and when the interactive element is re-enabled (e.g., through the use of a timer). Advantageously, doing so helps to prevent a single user from providing an undue amount of feedback for a single instance of content. Furthermore, the user feedback component 135 could also ensure that a minimum amount of time passes between the generation of the notifications, in order to avoid an undue number of notifications from being sent to a single user for a particular piece of content.

By selectively re-enabling the interactive element within the user interface, embodiments enable users to provide feedback for multiple iterations of an instance of user-generated content 125. This, in turn, provides an improved user feedback mechanism for the content 125 on the server system 100, as the user-generated content 125 may be more fairly rated. That is, continuing the above example, although the first user may decline to provide positive feedback for the first iteration of the instance of content created by the second user (i.e., the first version of the content the second user has created), the user feedback component 135 could notify the first user when the second user has updated the content, prompting the first user to again review and provide feedback for the content. As such, embodiments help to avoid the second user's content from earning a poor rating, merely because the content was incomplete in earlier iterations. Additionally, embodiments help to promote social interaction between the users, as the user feedback notifications to communicate with one another.

In a particular embodiment, users of the content server may be restricted to only providing positive feedback for instances of user-generated content. That is, the user interface on the client devices may only include an interactive element for providing positive feedback (e.g., a "Like" button) and may not include any interactive elements for providing negative feedback or a lower rating. Such an embodiment may be appropriate, for instance, in a content server targeted at a young audience (e.g., a virtual world intended for children). An example of such an embodiment is discussed with respect to FIG. 2, which shows a flow diagram illustrating a method of collecting user feedback for an instance of user-generated content. As shown, the method 200 begins at block 210, where the user feedback component 135 receives an indication of positive feedback from a first user for a first instance of user-generated content. Such an indication of positive feedback could be generated, for instance, responsive to a user interacting with an interaction element associated with the instance of user-generated content (e.g., by selecting a positive feedback button within a user interface).

Figure 2:
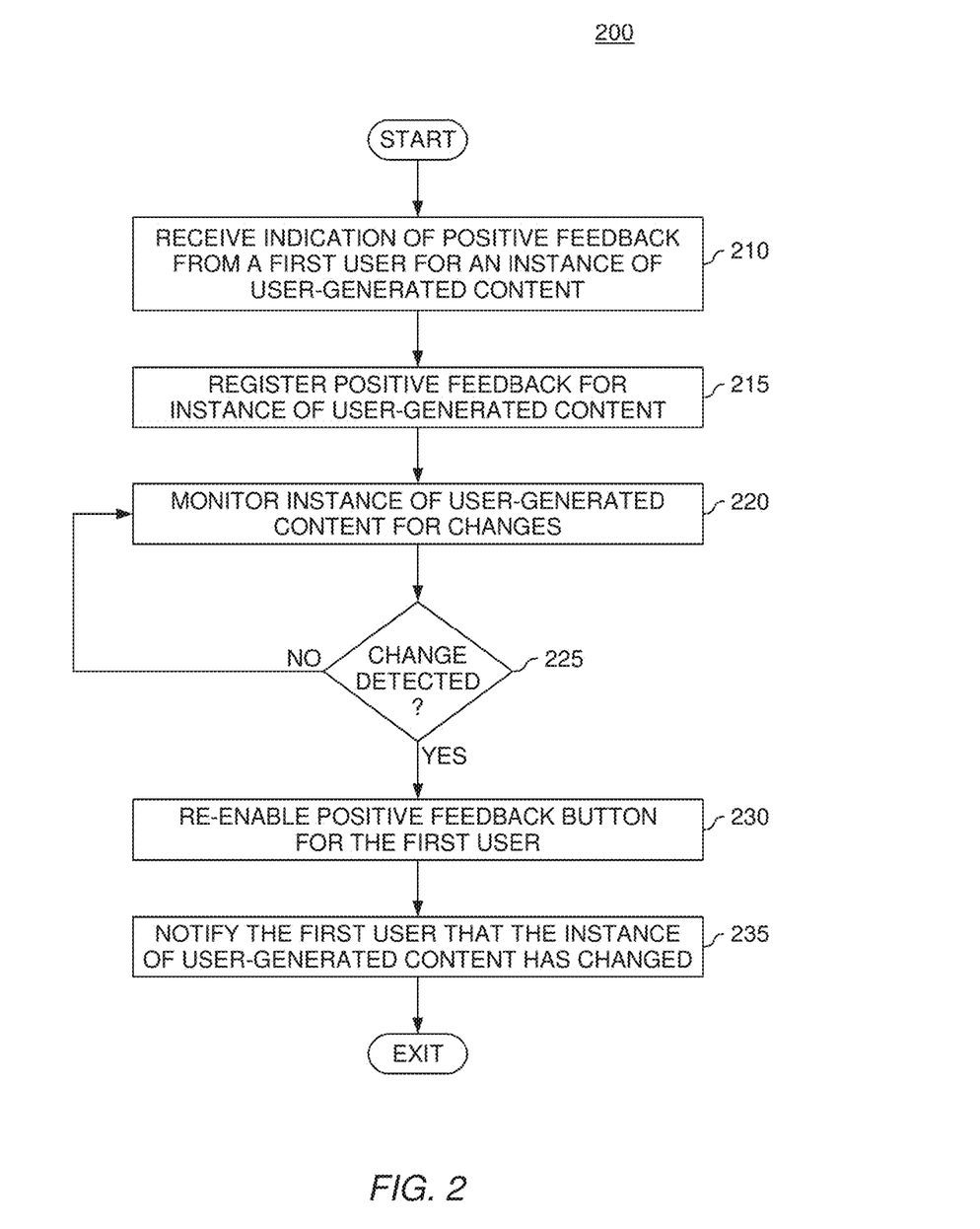
FIG. 2 is a flow diagram illustrating a method of collecting user feedback for an instance of user-generated content, according to one embodiment described herein.

The user feedback component 135 then registers the indication of positive feedback with the instance of user-generated content (block 215). For example, the user feedback component 135 could increment a counter associated with the instance of user-generated content. In the depicted embodiment, the user feedback component 135 monitors the instance of user-generated content upon registering the positive indication of positive feedback (block 220) and determines whether the content has been modified (block 225). Generally speaking, such user-generated content would typically be modified by the user that created the content. If the user feedback component 135 determines the content has not changed, the method 200 returns to block 220, where the user feedback component 135 continues monitoring the instance of content.

If instead the user feedback component 135 determines the content has changed, the user feedback component 135 re-enables the interactive element (i.e., a positive feedback button in the current example) associated with the instance of content for the first user (block 230). Thus, similar to as discussed above, the user feedback component 135 in the current example is configured to re-enable the interactive element associated with the user-generated content for the first user, upon determining that the content has been modified. The user feedback component 135 further generates a notification indicating that the instance of user-generated content has changed and transmits to generated notification to the first user (block 235). Once the first user is notified, the method 200 ends. Advantageously, doing so enables the first user to provide multiple instances of positive feedback for the multiple iterations of the instance of user-generated content. Additionally, the method 200 may help to promote social interactions between the users of the content server, as the first user is kept apprised of updates to the instance of user-generated content, which may encourage the first user to reach out to the creator of the content and share his thoughts regarding the content.

In a particular embodiment, the user that authored the instance of content is provided with an option to re-enable the "Like" button for all users who have already submitted positive feedback for the instance of content. For example, a first user could create an igloo within an arctic-themed virtual world and a second user could provide positive feedback for the first user's igloo by depressing the "Like" button associated with the first user's igloo. As discussed above, the user feedback component 135 could then disable the "Like" button associated with the first user's igloo for the second user. Additionally, the user feedback component 135 could provide an interactive element for the first user that allows the first user to re-enable the "Like" button for all users who have previously provided positive feedback for the first user's igloo. The user feedback component 135 could further be configured to generate a notification to the other users who have previously provided positive feedback for the first user's igloo, notifying them that the first user has made changes to the igloo and that they can provide additional positive feedback for the updated igloo if they wish. Advantageously, doing so allows a user to control when the interactive elements for providing feedback for the user's content will be re-enabled, which in turn allows the user to prevent the interactive elements from being re-enabled before the user is ready (e.g., when the user has not yet finished revising the content).

Figure 3:
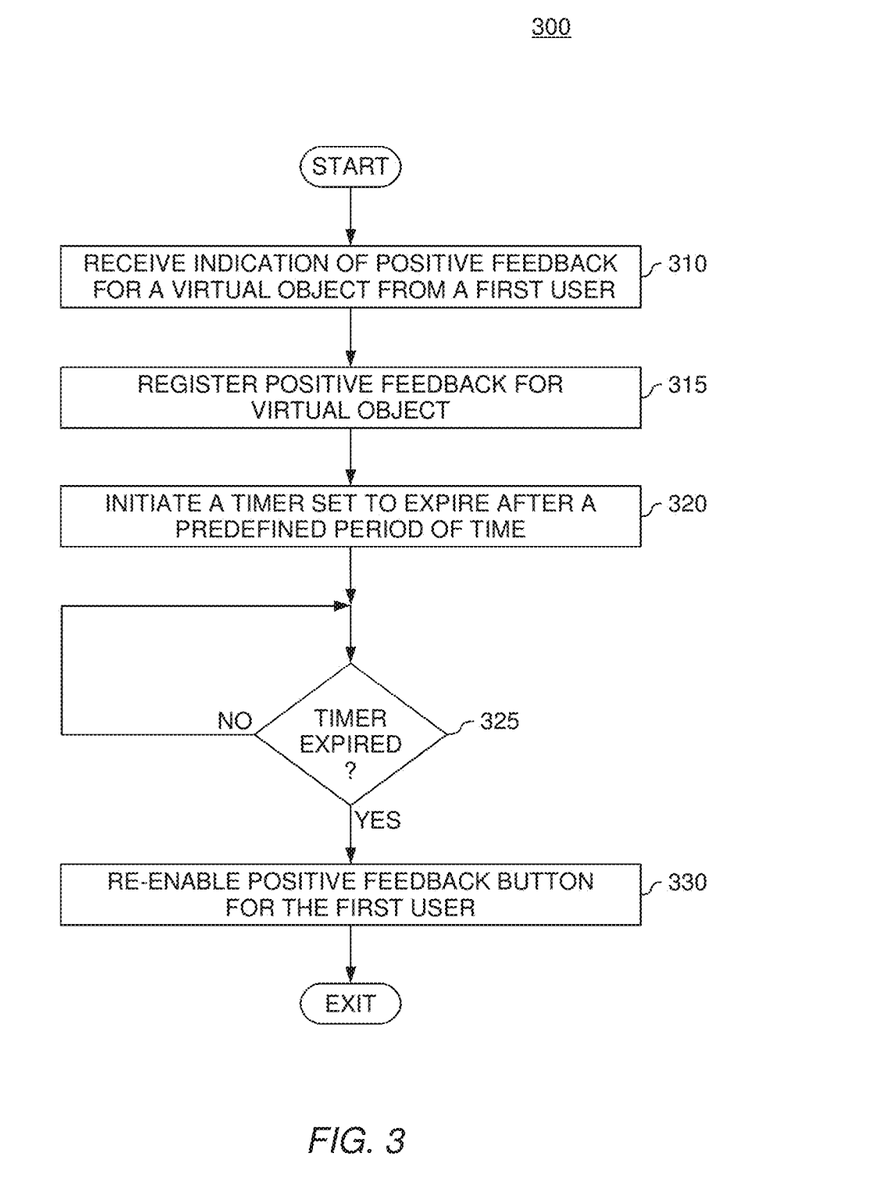
FIG. 3 is a flow diagram illustrating a method of collecting user feedback for a virtual object, according to one embodiment described herein.

FIG. 3 is a flow diagram illustrating a method of collecting user feedback for a virtual object, according to one embodiment described herein. As shown, the method 300 begins at block 310, where the user feedback component 135 receives an indication of positive feedback for a virtual object from a first user. Generally, the virtual object represents any object present within a virtual world. Such a virtual object could be created, for instance, by a developer of the virtual world or by one or more users of the virtual world. The user feedback component 135 then registers the positive feedback with the virtual object (block 315) and initiates a timer set to expire after a predetermined period of time, e.g., 24 hours (block 320). In one embodiment, the timer may be set to expire at a predetermined period of time. For instance, the timer could be configured to expire at midnight every night.

In the depicted embodiment, the user feedback component 135 then determines whether the timer has expired (block 325). If the timer has not yet expired, the method 300 repeats block 325 at some later point in time. If instead the user feedback component 135 determines that the timer has expired, the user feedback component 135 re-enables the positive feedback button associated with the virtual object for the first user (block 330) and the method 300 ends. Advantageously, the use of such a timer can help to prevent a single user from providing an excessive amount of positive feedback within a short amount of time for a single virtual object. Additionally, the use of such a timer can help to encourage users to connect to the virtual world frequently and over an extended period of time, if the users wish to continue to provide positive feedback for a virtual object. For example, two users could enter into an agreement with one another where each user will connect to the virtual world daily and provide additional positive feedback for the other user's virtual object. Thus, doing so promotes social interaction between the users and also encourages the users to repeatedly connect to the virtual world.

As discussed above, the user feedback component 135 may be configured to present information to a first user describing how other users have rated content created by the first user over a period of time. Such an example is discussed with respect to FIG. 4, which is a flow diagram illustrating a method of analyzing user feedback for several iterations of an instance of user-generated content. As shown, the method 400 begins at block 410, where a first user creates a first instance of content on a content server (e.g., a virtual world). At some later point in time, the user feedback component 135 receives an indication of either positive or negative feedback from a second user for the first instance of user-generated content (block 415). Additionally, at some point, the first user modifies the first instance of user-generated content (block 420). For example, if the user-generated content consists of a virtual residence within a virtual world created for the first user's avatar, the first user could modify the virtual residence by adding virtual objects to the residence, adjusting the placement of various virtual objects within the residence, and so on.

Figure 4:
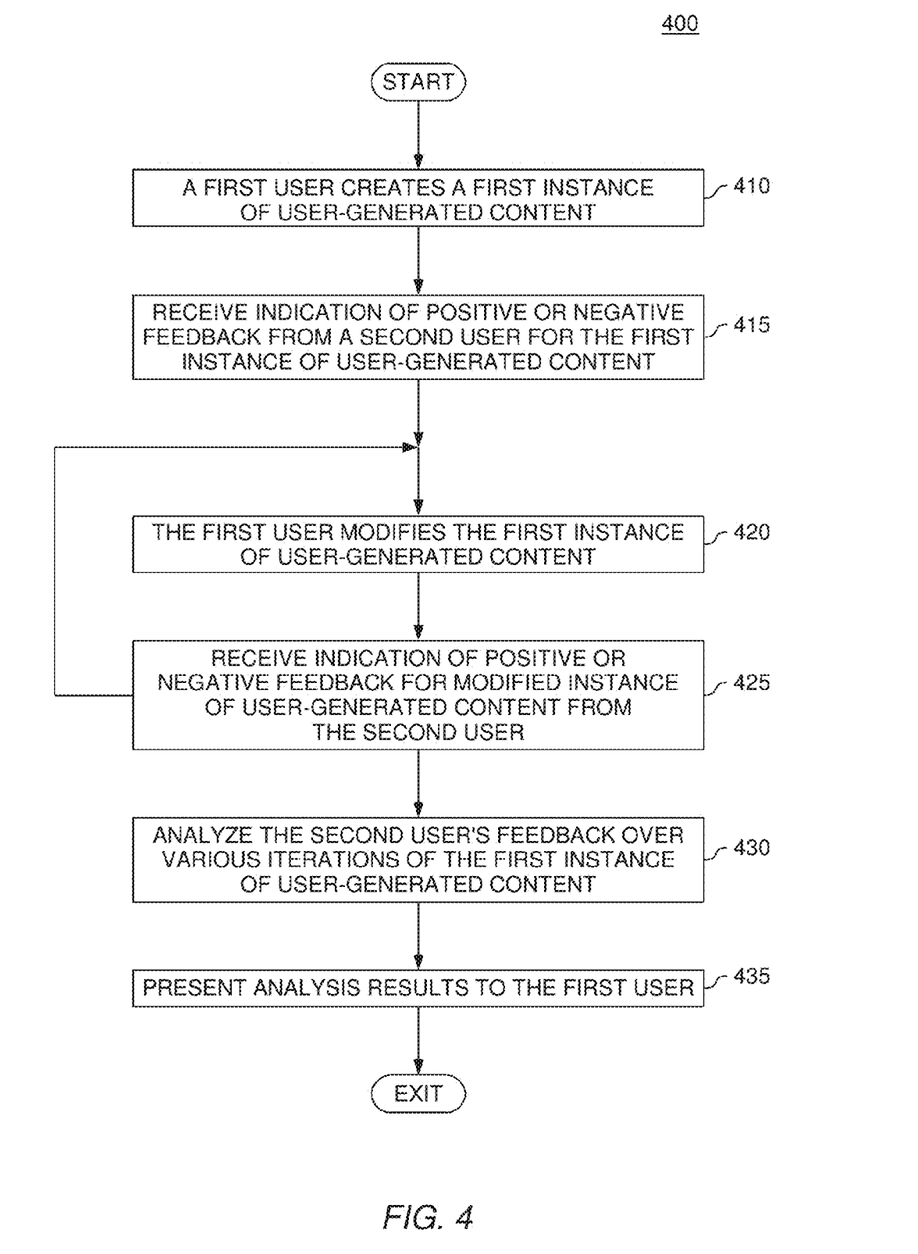
FIG. 4 is a flow diagram illustrating a method of analyzing user feedback for several iterations of an instance of user-generated content, according to one embodiment described herein.

The user feedback component 135 then receives a second indication of either positive or negative feedback for the modified instance of content (block 425). For example, while the first indication of user feedback could be received from a second user, the second indication of user feedback could be received from a different user of the content server. As another example, the first indication of user feedback could be received from a second user and, in response to such a modification to the first instance of content, the user feedback component 135 could re-enable an interactive element (e.g., a "Like" button) associated with the first instance of content for the second user (e.g., using the method 200).

Upon receiving the second indication of user feedback for the user-generated content, the user feedback component 135 identifies a plurality of iterations of the first instance of user-generated content (e.g., each iteration defined by a session in which the first user edited the content) and analyzes the user feedback received for the first instance of user-generated content over the various iterations of the content (block 430). In one embodiment, the iterations of the user-generated content are defined based on the first user's sessions within a virtual world. For example, assume that a user connects to the virtual world on a first day and creates a first instance of content, and then connects to the virtual world on a second day and modifies the first instance of content. In such an embodiment, the user feedback component 135 could determine that version of the content at the end of the first day represents a first iteration of the content and that the version at the end of the second day represents a second iteration of the content. The user feedback component 135 then presents the results of the analysis to the first user (block 435), and the method 400 ends.

For example, the user feedback component 135 could generate a visual representation of the user feedback (e.g., for display on a client device) showing the various iterations of the user-generated content and the number of instances of positive and negative feedback received for each of the iterations. The analysis could also reflect trending information regarding the user feedback. For instance, the visual representation could further indicate that, as an example, the user feedback has become increasingly positive in the most recent iterations of the user-generated content, indicating that the alterations the user has made are improving the content in the minds of the other users. By analyzing the user feedback over multiple iterations of the user-generated content, the user feedback component 135 may inform the first user about which modifications to the user-generated content have been well-received by the other users. The first user could then use this information in designing future content that will be well-received by the other users.

Figure 5A:
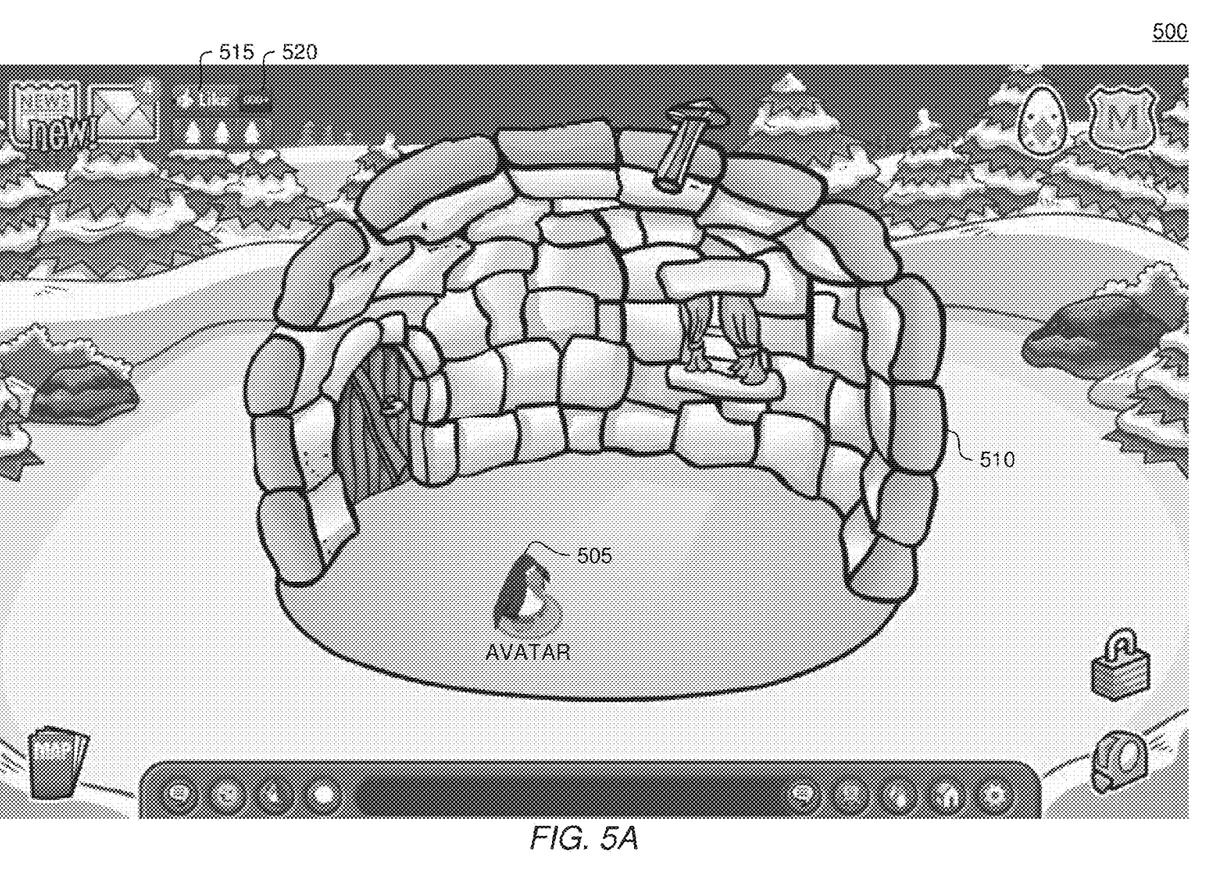
FIGS. 5A-C are screenshots illustrating a virtual world configured with a change-based revoting mechanism, according to embodiments described herein.
Figure 5B:
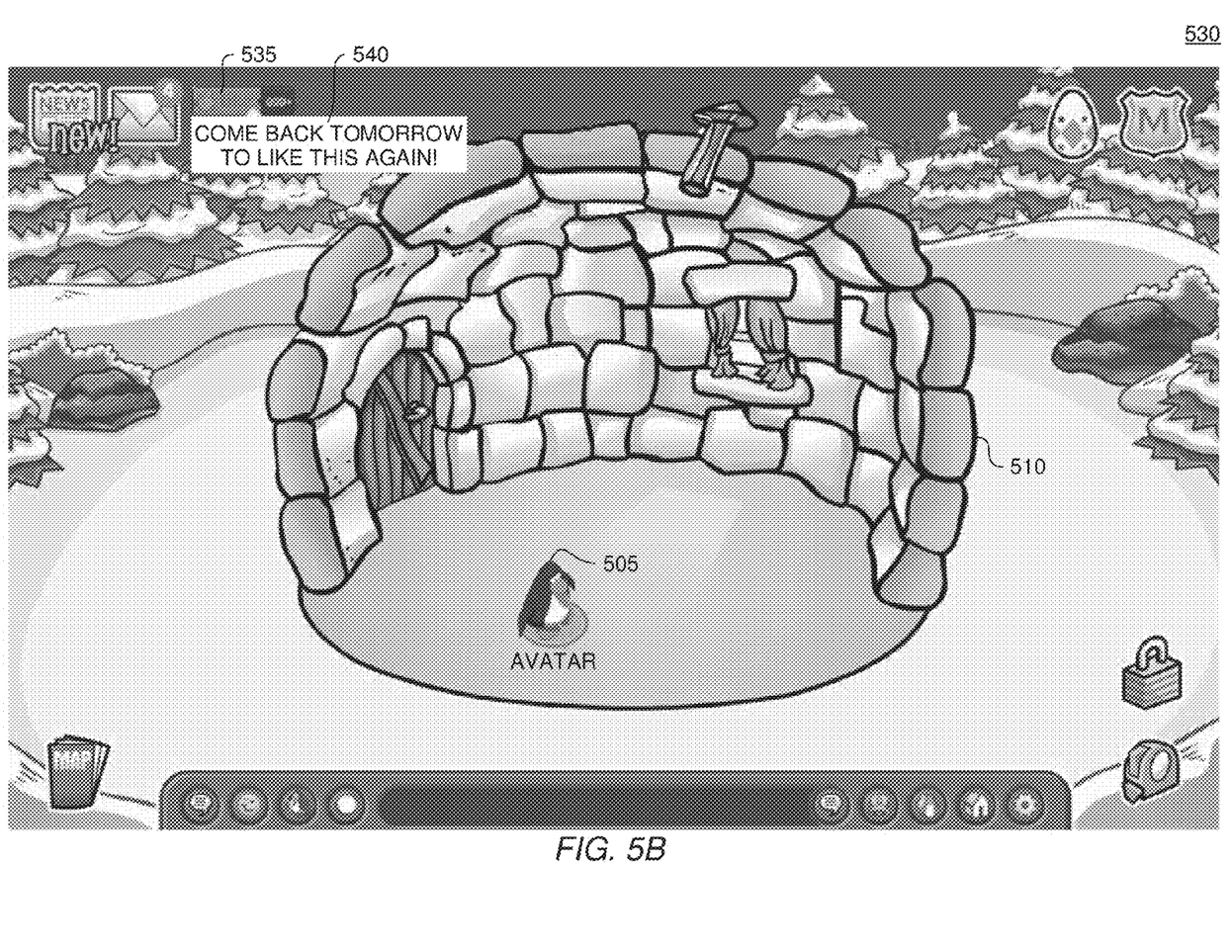
Figure 5C:
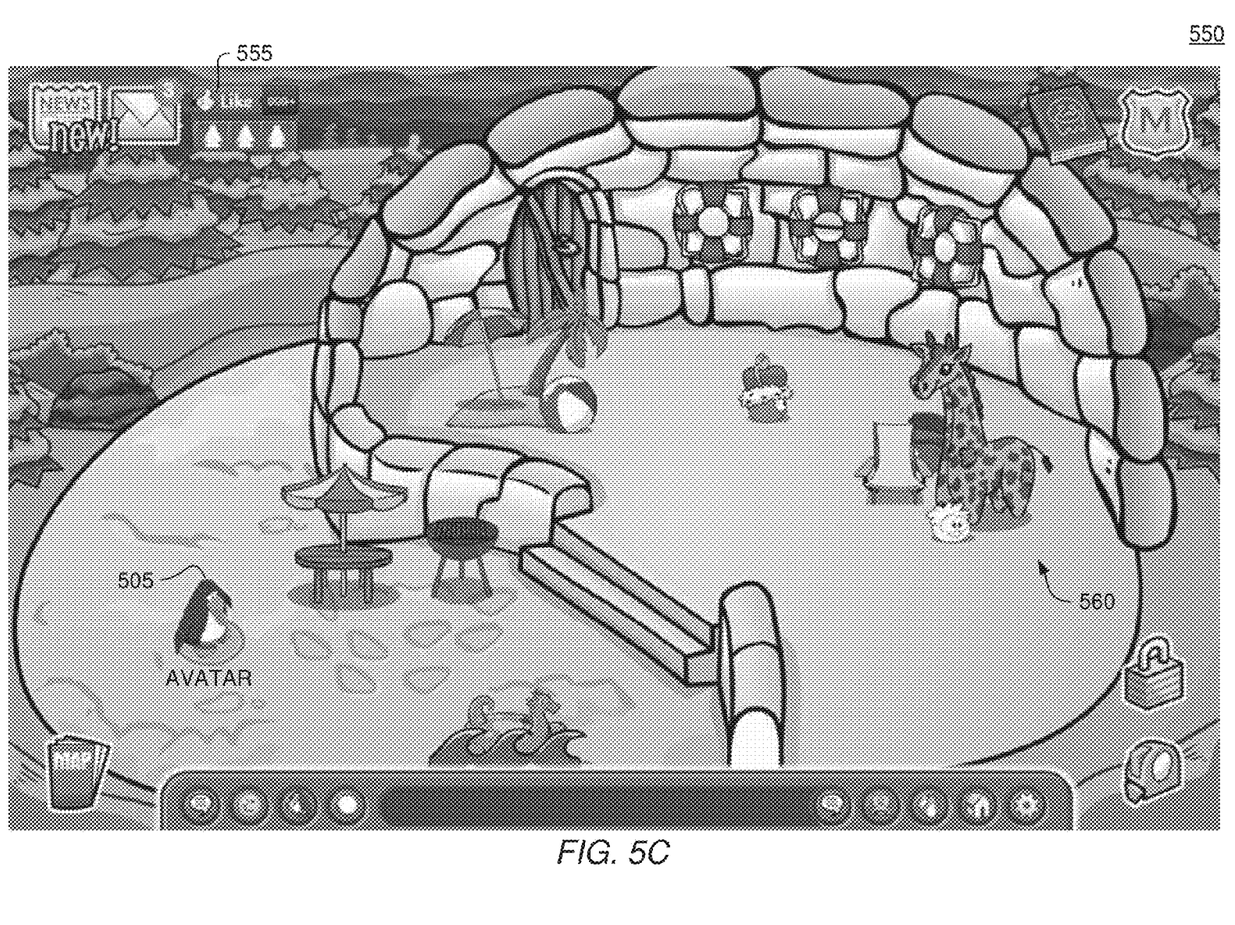

FIGS. 5A-C are screenshots illustrating a virtual world configured with a change-based revoting mechanism, according to embodiments described herein. For purposes of FIGS. 5A-C, assume that the depicted igloos represent instances of user-generated content that have been created by a first user, and that the depicted avatar represents the avatar of a second, different user viewing the first user's content. As shown in FIG. 5A, the screenshot 500 shows an avatar 505 associated with the second user and a user-generated igloo 510. Additionally, the screenshot 500 includes a "Like" button 515 and a feedback counter 520. As discussed above, users can interact with the "Like" button 515 (i.e., an interactive element) in order to express positive feedback for the associated content (i.e., the user-generated igloo 510 in the current example). The feedback counter 520 generally represents the amount of positive feedback that has been received for the corresponding content (i.e., the user-generated igloo 510).

In such an example, if the second user wishes to express positive feedback for the first user's igloo 510, the second user could interact with the "Like" button 515 (e.g., by selecting it with a cursor using an input device such as a mouse). In response to the second user interacting with the "Like" button 515, a game client (e.g., one of the clients $110_{1-N}$) could transmit a notification the user feedback component 135 (e.g., residing on a server system 120) indicating that the second user has submitted positive feedback for the igloo 510. In response to receiving the request, the user feedback component 135 could increment the feedback counter 520 and could disable the "Like" button 515 for the second user.

Such a situation is shown in FIG. 5B, which is a screenshot 530 including the avatar 505 and the user-generated igloo 510. As shown, the screenshot 530 depicts a disabled "Like" button 535 and a prompt 540 indicating that the second user can return to the virtual world tomorrow to submit additional positive feedback for the first user's igloo 510. Thus, in the current example, the user feedback component 135 is configured to re-enable the "Like" button 535 upon the expiration of the timer. As discussed above, such a timer could be set to expire after a predetermined period of time (e.g., 24 hours) or at a predetermined moment in time (e.g., midnight server time each evening). Additionally of note, although in the depicted embodiment the like counter 520 is capped at "999+" votes for the igloo 510, in other embodiments the displayed counter 520 could be incremented in response to the second user's feedback.

As discussed above, the user feedback component 135 may also be configured to re-enable the "Like" button 535 responsive to modifications to the user-generated igloo 510 by the first user. Such an example is shown in FIG. 5C, which is a screenshot 550 including the avatar 505 and an updated igloo 560. In this example, the first user has made a number of customizations to the igloo 560, including the addition of various objects (e.g., a giraffe, a patio table, a grill, etc.) and various structural alterations (e.g., a patio, additional windows, etc.). Generally, the user feedback component 135 could be configured to monitor the first user's behavior with respect to the igloo and to detect any alterations made to the igloo. Here, upon determining that the first user has modified the igloo 510 into the depicted igloo 560, the user feedback component 135 has re-enabled the "Like" button 555 for the second user, thereby allowing the second user to provide additional positive feedback for the igloo 560 if the second user wishes. As discussed above, in a particular embodiment, the user feedback component 135 could also be configured to generate a notification to the second user, informing the second user that the first user has modified the igloo 560 and inviting the second user to visit the updated igloo.

Figure 6:
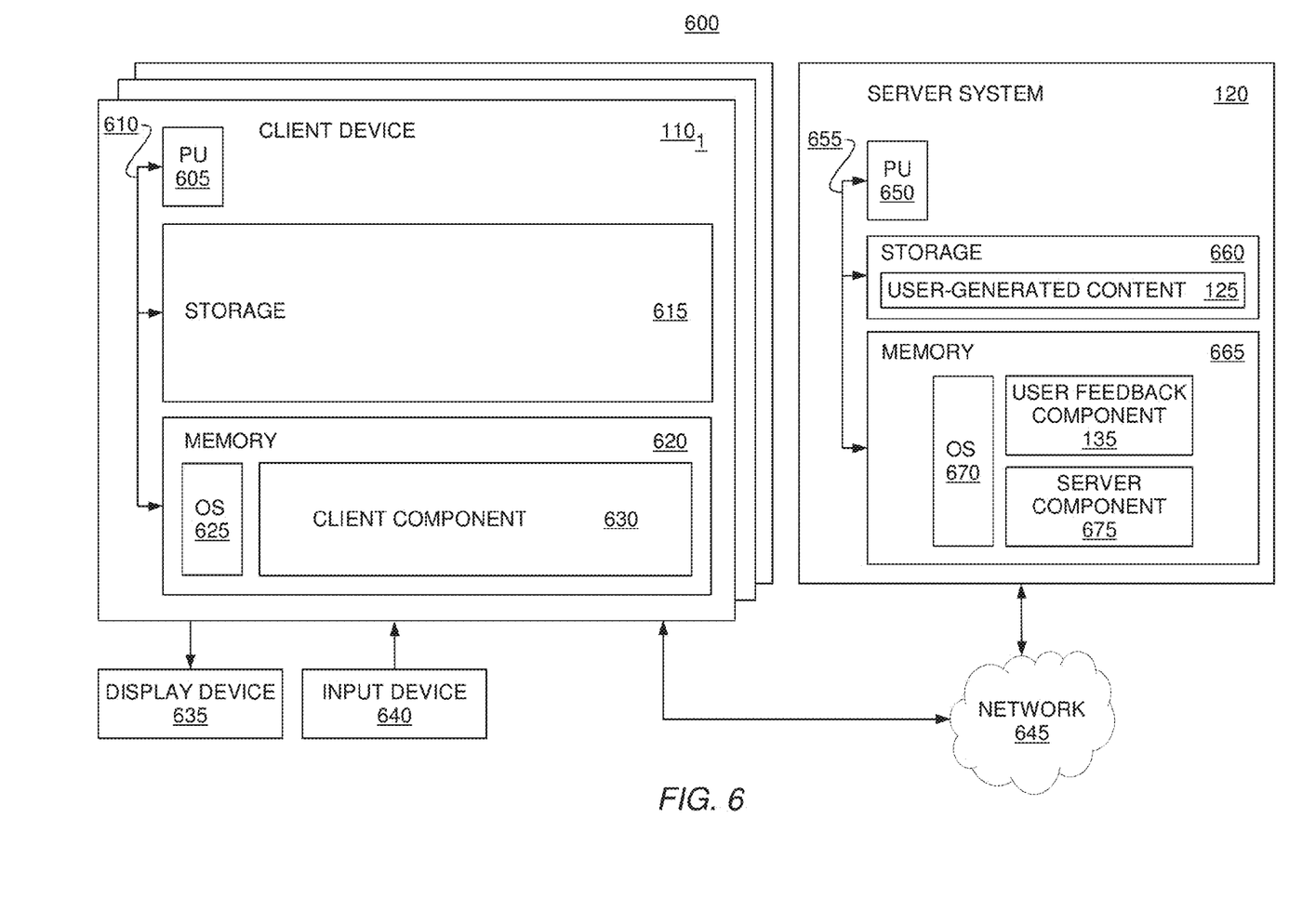
FIG. 6 is a block diagram illustrating a system configured with a user feedback component, according to one embodiment described herein.

FIG. 6 is a block diagram illustrating a system configured with a user feedback component, according to one embodiment described herein. As shown, the system 600 includes a plurality of client devices $110_{1-N}$ connected to a server system 120 via a network 645. In this example, the client devices $110_{1-N}$ include, without limitation, a processor 605, storage 615, and memory 620, interconnected via a bus 610. Generally, the processor 605 retrieves and executes programming instructions stored in the memory 620. Processor 605 is included to be representative of a single CPU, multiple CPUs, a single CPU having multiple processing cores, GPUs having multiple execution paths, and the like. The memory 620 is generally included to be representative of a random access memory. The client device $110_1$ may also include a network interface that enables the client device $110_1$ to connect to the data communications network 645 (e.g., wired Ethernet connection or an 802.11 wireless network). Further, while the depicted embodiment illustrates the components of a client device $110_1$, one of ordinary skill in the art will recognize that the client devices $110_{1-N}$ may use a variety of different hardware architectures. Moreover, it is explicitly contemplated that embodiments of the invention may be implemented using any device or computer system capable of performing the functions described herein.

The memory 620 represents any memory sufficiently large to hold the necessary programs and data structures. Memory 620 could be one or a combination of memory devices, including Random Access Memory, nonvolatile or backup memory (e.g., programmable or Flash memories, read-only memories, etc.). In addition, memory 620 and storage 615 may be considered to include memory physically located elsewhere; for example, on another computer communicatively coupled to the client device $110_1$. Illustratively, the memory 620 includes an operating system 625 and a client component 630. The operating system 625 generally controls the execution of application programs on the client device $110_1$. Examples of operating system 625 include UNIX, a version of the Microsoft Windows® operating system, and distributions of the Linux® operating system. Additional examples of operating system 625 include custom operating systems for gaming consoles, including the custom operating systems for systems such as the Nintendo DS® and Sony PSP®. Generally, the client component 630 represents a client application configured to connect to the server component 675 on the server system 120. Examples of such a client component 630 include, without limitation, a game client and a web browser.

The client device $110_1$ also includes a display device 635 and an input device 640. The input device 640 could represent a variety of different input devices, such as a keyboard, a mouse, and a touch screen. Likewise, the display device 635 could be any device capable of displaying an interface for the client component 630 (e.g., a monitor, a touch screen on a portable gaming device, a television display, etc.) As an example, the display may provide a touch sensitive surface allowing the user to select different applications and options within an application (e.g., to interact with a "Like" button within an interface for the client component 630). Additionally, the input devices 640 may include a set of buttons, switches or other physical device mechanisms for controlling the client device $110_1$. For example, the input devices 640 could include a set of directional buttons used to control aspects of a video game played using the client device $110_1$.

Similarly, the server system 120 includes a processor 650, storage 660, and memory 665, interconnected via a bus 655. Generally, the processor 650 retrieves and executes programming instructions stored in the memory 665. Processor 650 is included to be representative of a single CPU, multiple CPUs, a single CPU having multiple processing cores, GPUs having multiple execution paths, and the like. The memory 665 is generally included to be representative of a random access memory. The server system 120 may also include a network interface that enables the server system 120 to connect to the data communications network 645 (e.g., wired Ethernet connection or an 802.11 wireless network). Further, while the depicted embodiment illustrates the components of a particular server system 120, one of ordinary skill in the art will recognize that the server system 120 may use a variety of different hardware architectures. Moreover, it is explicitly contemplated that embodiments of the invention may be implemented using any device or computer system capable of performing the functions described herein.

The memory 665 represents any memory sufficiently large to hold the necessary programs and data structures. Memory 665 could be one or a combination of memory devices, including Random Access Memory, nonvolatile or backup memory (e.g., programmable or Flash memories, read-only memories, etc.). In addition, memory 665 and storage 660 may be considered to include memory physically located elsewhere; for example, on another computer communicatively coupled to the server system 120. As shown, the storage 660 contains user-generated content 125, which could include, without limitation, virtual objects, images, audio content, and video content. Illustratively, the memory 665 includes an operating system 670, a user feedback component 135 and a server component 675. The operating system 670 generally controls the execution of application programs on the server system 120. Examples of operating system 670 include UNIX, a version of the Microsoft Windows® operating system, and distributions of the Linux® operating system. Additional examples of operating system 670 include custom operating systems for gaming consoles, including the custom operating systems for systems such as the Nintendo DS® and Sony PSP®. Generally, the server component 675 represents a server application configured to connect to the client components 630 on the client devices $110_{1-N}$. Examples of such a server component 675 include, without limitation, a game server and a web server.

Generally, the user feedback component 135 manages the collection of user feedback for instances of the user-generated content 125. For instance, the server component 675 could provide an interface to be displayed on the display device 635 by the client component 630, the interfacing including an interactive element through which users can provide feedback for an instance of content. For instance, the interface could include a "Like" button associated with an instance of the user-generated content 125. Responsive to a first user interacting with the interactive element, the client component 630 could transmit an indication of the user feedback to the user feedback component 135 (e.g., using the network 645) Responsive to receiving the indication of user feedback, the user feedback component 135 could disable the interactive element within the interface for the first user. Continuing the example, the user feedback component 135 could disable the "Like" button, such that the button appears greyed out and is no longer selectable by the user. The user feedback component 135 could then monitor the instance of user-generated content 125 to detect changes to the content. Upon detecting such a change, the user feedback component 135 could again enable the interactive element for the first user, such that the first user can again interact with the interactive element. Thus, continuing the above example, the user feedback component 135 could re-enable the "Like" button so that the button is colored once again and is selectable by the user. Advantageously, doing so enables the user to provide multiple instances of positive feedback for a single instance of user-generated content 125.

In the preceding, reference is made to embodiments of the invention. However, the invention is not limited to specific described embodiments. Instead, any combination of the following features and elements, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the invention. Thus, the preceding aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present invention, a user could access and provide feedback for user-generated content stored in the cloud. For example, a user feedback component 135 could execute on a computer system within the cloud and could user-feedback for the instances user-generated content stored in the cloud. Upon receiving feedback for an instance of content, the user feedback component 135 could disable an interactive element (e.g., a "Like" button) associated with the instance of content. Further, upon detecting that the instance of content has been modified, the user feedback component 135 could once again enable the interactive element associated with the instance of content. Doing so allows a user to access and provide repeated feedback for the user-generated content from any device or computer system attached to a network connected to the cloud (e.g., the Internet).

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Each block of the block diagrams and/or flowchart illustration, and combinations of blocks in the block diagrams and/or flowchart illustration, can be implemented by special-purpose hardware-based systems that perform the specified functions or acts, or combinations of special purpose hardware and computer instructions.

While the foregoing is directed to embodiments of the present invention, other and further embodiments of the invention may be devised without departing from the basic scope thereof, and the scope thereof is determined by the claims that follow.

What is claimed is:

1. A method, comprising:
providing an interface that includes an interactive element through which users can provide feedback for an instance of content;
responsive to a first user interacting with the interactive element, registering an indication of user feedback from the first user for the instance of content;
upon determining that the indication of user feedback from the first user has been registered for the instance of content, disabling the interactive element within the interface for the first user, such that the first user cannot interact with the interactive element within the interface;
monitoring the instance of content to detect changes to the instance of content; and
upon detecting a change to the instance of content since the first user provided the user feedback for the content, automatically and without user interaction, re-enabling the interactive element within the interface for the first user such that the first user can again interact with the interactive element.

2. The method of claim 1, further comprising:
responsive to the first user interacting with the interactive element, initiating a timer configured to expire after a predetermined period of time; and
upon expiration of the timer, enabling the interactive element for the first user such that the first user can again interact with the interactive element.

3. The method of claim 1, wherein the instance of content is user-generated content created by a second user, and wherein the detected changes to the instance of content are made by the second user.

4. The method of claim 3, wherein the interface is configured to only allow users to submit either positive or negative feedback for the instance of content, and further comprising:
presenting an indication of user feedback for multiple iterations of the instance of content.

5. The method of claim 1, wherein the user feedback is positive feedback, and wherein the interface is configured to only allow users to submit positive feedback for the instance of content.

6. The method of claim 5, wherein registering the indication of user feedback from the first user for the instance of content further comprises:
incrementing a counter associated with the instance of content, wherein the counter represents a total number of indications of user feedback received for the instance of content; and
outputting the incremented counter for display in the interface.

7. A system, comprising:
a processor; and
a memory containing a program that, when executed by the processor, performs an operation comprising:
providing an interface that includes an interactive element through which users can provide feedback for an instance of content;
responsive to a first user interacting with the interactive element, registering an indication of user feedback from the first user for the instance of content;
upon determining that the indication of user feedback from the first user has been registered for the instance of content, disabling the interactive element within the interface for the first user, such that the first user cannot interact with the interactive element within the interface;
monitoring the instance of content to detect changes to the instance of content; and
upon detecting a change to the instance of content since the first user provided the user feedback for the content, automatically and without user interaction, re-enabling the interactive element for the first user such that the first user can again interact with the interactive element.

8. The system of claim 7, the operation further comprising:
responsive to the first user interacting with the interactive element, initiating a timer configured to expire after a predetermined period of time; and
upon expiration of the timer, enabling the interactive element for the first user such that the first user can again interact with the interactive element.

9. The system of claim 7, wherein the instance of content is user-generated content created by a second user, and wherein the detected changes to the instance of content are made by the second user.

10. The system of claim 9, wherein the interface is configured to only allow users to submit either positive or negative feedback for the instance of content, and the operation further comprising:
presenting an indication of user feedback for multiple iterations of the instance of content.

11. The system of claim 7, wherein the user feedback is positive feedback, and wherein the interface is configured to only allow users to submit positive feedback for the instance of content.

12. The system of claim 11, wherein registering the indication of user feedback from the first user for the instance of content further comprises:
incrementing a counter associated with the instance of content, wherein the counter represents a total number of indications of user feedback received for the instance of content; and
outputting the incremented counter for display in the interface.

13. A non-transitory computer-readable medium containing a program that, when executed, performs an operation comprising:
providing an interface that includes an interactive element through which users can provide feedback for an instance of content;
responsive to a first user interacting with the interactive element, registering an indication of user feedback from the first user for the instance of content;
upon determining that the indication of user feedback from the first user has been registered for the instance of content, disabling the interactive element within the interface for the first user, such that the first user cannot interact with the interactive element within the interface;
monitoring the instance of content to detect changes to the instance of content; and
upon detecting a change to the instance of content since the first user provided the user feedback for the content, automatically and without user interaction, re-enabling the interactive element for the first user such that the first user can again interact with the interactive element.

14. The non-transitory computer-readable medium of claim 13, the operation further comprising:
responsive to the first user interacting with the interactive element, initiating a timer configured to expire after a predetermined period of time; and
upon expiration of the timer, enabling the interactive element for the first user such that the first user can again interact with the interactive element.

15. The non-transitory computer-readable medium of claim 13, the operation further comprising:
responsive to the first user interacting with the interactive element, initiating a timer configured to expire at a predetermined moment in time; and
upon expiration of the timer, enabling the interactive element for the first user such that the first user can again interact with the interactive element.

16. A method, comprising:
providing an interface that includes an interactive element through which users can provide feedback for an instance of user-generated content created by a first user within a virtual world;

responsive to a second user interacting with the interactive element, registering an indication of user feedback from the second user for the instance of content;

upon determining that the indication of user feedback from the first user has been registered for the instance of content:

disabling the interactive element within the interface for the second user, such that the second user cannot interact with the interactive element within the interface; and initiating a timer associated with the disabled interactive element; and upon expiration of the timer, re-enabling the interactive element for the second user such that the second user can again interact with the interactive element.

17. The method of claim 16, wherein the timer is configured to expire after a predetermined amount of time.

18. The method of claim 16, wherein the timer is configured to expire at a predetermined moment in time.

19. The method of claim 16, wherein the interface is provided at a first site, and the method further comprising:

providing, at the first site, a second interface through which an author of the instance of content can edit the instance of content, wherein detecting the change to the instance of content further comprises detecting that one or more edits have been made to the instance of content using the provided second interface.

20. The method of claim 16, further comprising:

generating a visual representation of trending information for two or more versions of the instance of content, with respect to at least one of (i) positive feedback and (ii) negative feedback.

\* \* \* \* \*

UNITED STATES PATENT AND TRADEMARK OFFICE
CERTIFICATE OF CORRECTION

PATENT NO. : 10,133,464 B2
APPLICATION NO. : 14/797832
DATED : November 20, 2018
INVENTOR(S) : Paul Pak et al.

Page 1 of 1

It is certified that error appears in the above-identified patent and that said Letters Patent is hereby corrected as shown below:

On the Title Page

In item (72), in Column 1, in "Inventors", Line 4, delete "Kirland, WA (US);" and insert -- Kirkland, WA (US); --, therefor.

In the Claims

In Column 19, Line 5, in Claim 16, delete "first" and insert -- second --, therefor.

Signed and Sealed this
Nineteenth Day of March, 2019

Andrei Iancu
*Director of the United States Patent and Trademark Office*